US010641904B2

(12) United States Patent
Fleizach et al.

(10) Patent No.: US 10,641,904 B2
(45) Date of Patent: May 5, 2020

(54) AUXILIARY GLOBAL POSITIONING SYSTEM

(71) Applicant: The United States of America as represented by the Secretary of the Navy, San Diego, CA (US)

(72) Inventors: Gregory K. Fleizach, San Diego, CA (US); Barry Hunt, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 339 days.

(21) Appl. No.: 15/896,974

(22) Filed: Feb. 14, 2018

(65) Prior Publication Data

US 2019/0250279 A1  Aug. 15, 2019

(51) Int. Cl.
*G01S 19/09* (2010.01)
*G01S 19/25* (2010.01)
*G01S 19/24* (2010.01)
*G01S 19/11* (2010.01)

(52) U.S. Cl.
CPC ............. *G01S 19/09* (2013.01); *G01S 19/11* (2013.01); *G01S 19/243* (2013.01); *G01S 19/258* (2013.01)

(58) Field of Classification Search
CPC ........ G01S 19/09; G01S 19/11; G01S 19/243; G01S 19/258
See application file for complete search history.

(56) References Cited

U.S. PATENT DOCUMENTS

| 5,786,773 A | 7/1998 | Murphy |
| 6,336,076 B1 | 1/2002 | Farley et al. |
| 7,495,609 B1* | 2/2009 | Woo ........................ G01S 19/05 342/357.64 |
| 8,199,051 B2* | 6/2012 | Anderson ............... G01S 19/34 342/357.31 |
| 2002/0082024 A1 | 6/2002 | Bajikar |
| 2008/0074322 A1 | 3/2008 | Ryba |
| 2009/0219976 A1 | 9/2009 | Oren et al. |
| 2013/0242857 A1* | 9/2013 | Tani ....................... H04B 7/185 370/316 |

FOREIGN PATENT DOCUMENTS

WO    WO03104837    12/2003

* cited by examiner

*Primary Examiner* — Olumide Ajibade Akonai
(74) *Attorney, Agent, or Firm* — Naval Information Warfare Center, Pacific; Kyle Eppele; Young Fei

(57) ABSTRACT

A method of providing accurate position, navigation, and timing information comprising the steps of providing at least four transceiver devices, providing an auxiliary GPS device, and providing a receiver GPS device. Each transceiver devices receives a plurality of GPS signals from a plurality of GPS satellites, and calculates a transceiver position and transceiver velocity vector. The transceiver position, transceiver velocity vector, and GPS signal are repackaged at each transceiver into a first spread signal structure, which is transmitted from each transceiver as a first GPS-like signal. The GPS-like signal is received at an auxiliary GPS device, which generates a simulated GPS signal. This simulated GPS signal is then output and received by a simulated GPS device.

20 Claims, 6 Drawing Sheets

AUXILIARY GLOBAL POSITIONING SYSTEM

FEDERALLY SPONSORED RESEARCH AND DEVELOPMENT

The Auxiliary Global Positioning System is assigned to the United States Government and is available for licensing and for commercial purposes. Licensing and technical inquiries may be directed to the Office of Research and Technical Applications, Space and Naval Warfare Systems Center Pacific (Code 72120), San Diego, Calif., 92152 via telephone at (619) 553-2778 or email at ssc_pac_t2@navy.mil. Reference Navy Case 104873.

BACKGROUND OF THE INVENTION

This invention addresses the problem of obtaining accurate positional, navigational, and timing (PNT) information in adverse physical environmental conditions (e.g., under jungle canopy or within urban canyons) as well as under adverse radio frequency (RF) environmental conditions (e.g., under jamming conditions or in the presence of spoofing signals). This invention presents a solution that is backwards-compatible with existing GPS technology.

Whether the adverse environment is natural or manmade, there are many scenarios under which existing GPS technology does not perform well. For example, under the cover of dense jungle foliage or from the inside of buildings, the GPS signal strength is often so attenuated that it becomes unusable. When users are deliberately jammed or spoofed by adversaries, a different set of issues may arise. While the GPS constellation is undergoing an upgrade which will modernize the GPS signal (e.g., the L1C signal), in the near term, the space vehicles (SVs) or GPS satellites 500 currently in service are fixed in their orbits. FIG. 1. It is not possible or feasible for the existing GPS satellites 500 to increase their power output, change their transmission frequency, or change their message structure.

Other approaches to addressing the adverse environment problem have considered specialized signal processing on the GPS receiver 401 to increase the processing gain in order to to allow the signal to be acquired and tracked at a lower signal level. However, the problem with this approach is that existing commercial GPS chips are widely deployed, have been heavily tested, and have extensive certification processes in place. These existing commercial GPS chips utilize the existing GPS signal parameters. Any approach utilizing unique processing requirements would necessitate costly bespoke GPS receiver design, development, and testing. Additionally, these solutions are typically more power-hungry and slower than conventional GPS receivers.

Another possible solution to the problem of obtaining accurate PNT in adverse environments is rebroadcasting the GPS signal within the current GPS band. The problem with this is that GPS receivers calculating their position based on the rebroadcast signal will end up calculating the position of the rebroadcasting station as opposed to their own position. In order for such a system to be practically usable, a separate method of obtaining range and bearing from the rebroadcast station is necessary. Such a solution however, may have adverse effects on other users trying to receive the actual GPS signals due to interference. Additionally, the testing and fielding of such a system presents a myriad of regulatory burdens, as special exemptions are required to transmit any kind of energy in the GPS RF band.

A system receiving GPS-like signals from pseudolites or other transmitters on a radio frequency different from the GPS band is another potential solution. However, these solutions require a separate stand-alone receiver which would only work when within range of the pseudolites. This would mean that the end user needs to carry an additional device with them. Such an alternative GPS would require a separate battery, screen, and antenna as well as utilize an entirely different set of electronics. Deployed en masse, such a solution would incur massive additional costs when compared with using existing GPS solutions.

Less complicated and less accurate methods are also possible, such as reliance on inertial navigation units (INUs) to maintain and update positional and navigational data in adverse environments, coupled with precision clocks (e.g., chip-scale atomic clocks) to maintain and update good timing. These devices however, are typically very delicate and not as accurate as the robust existing GPS technology. Such devices also require calibration prior to entering the adverse environment in the first instance, whereas the GPS is self-calibrating. A GPS system with a "cold start" (i.e., beginning with no information about where it is or what time it is) can have a highly accurate PNT solution in approximately 30 seconds.

Finally, the least accurate and most manually intensive methods are those such as dead reckoning or celestial navigation (e.g., reliance on maps and compasses or sextants). These approaches are typically used only as a last resort, and are not considered a feasible solution under most circumstances. Certainly, most of these types of alternatives are difficult from under heavy foliage cover or from within buildings.

SUMMARY OF THE INVENTION

The present invention is for a method of providing accurate position, navigation, and timing information comprising the steps of providing at least four transceiver devices, providing an auxiliary GPS device, and providing a receiver GPS device. Each transceiver device receives a plurality of GPS signals from a plurality of GPS satellites, and calculates a transceiver position and transceiver velocity vector. The transceiver position, transceiver velocity vector, and GPS signal are repackaged at each transceiver into a first spread signal structure, which is transmitted from each transceiver as a first GPS-like signal. The GPS-like signal is received at an auxiliary GPS device, which generates a simulated GPS signal. This simulated GPS signal is then output and received by a simulated GPS device.

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

While the invention may be embodied in different forms, the drawings and this section describe in detail specific embodiments of the invention with the understanding that the present disclosure is to be considered merely a preferred embodiment of the invention, and is not intended to limit the invention in any way.

Figure 1:
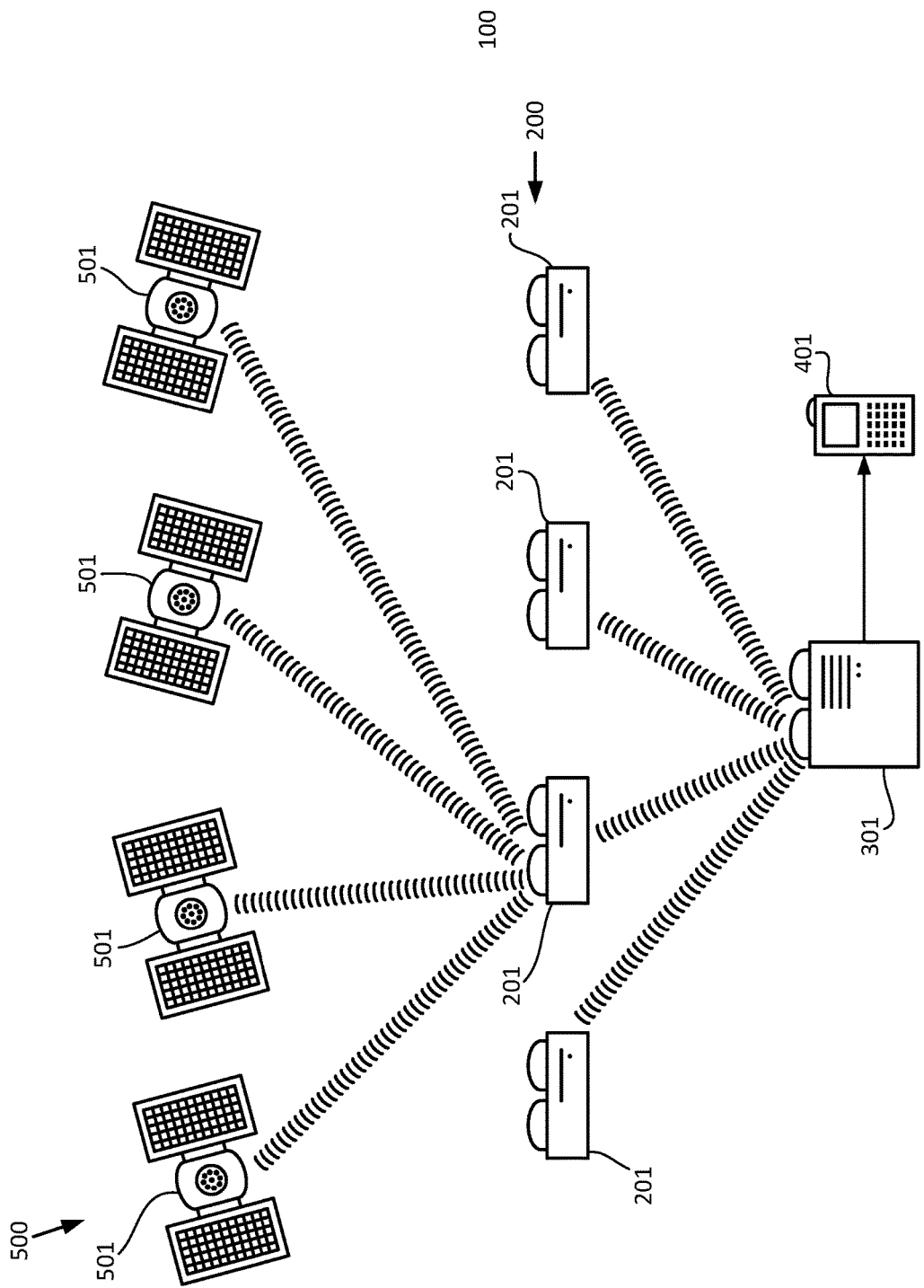
FIG. 1 shows a perspective view of the components used to implement an embodiment of the invention.
Figure 2:
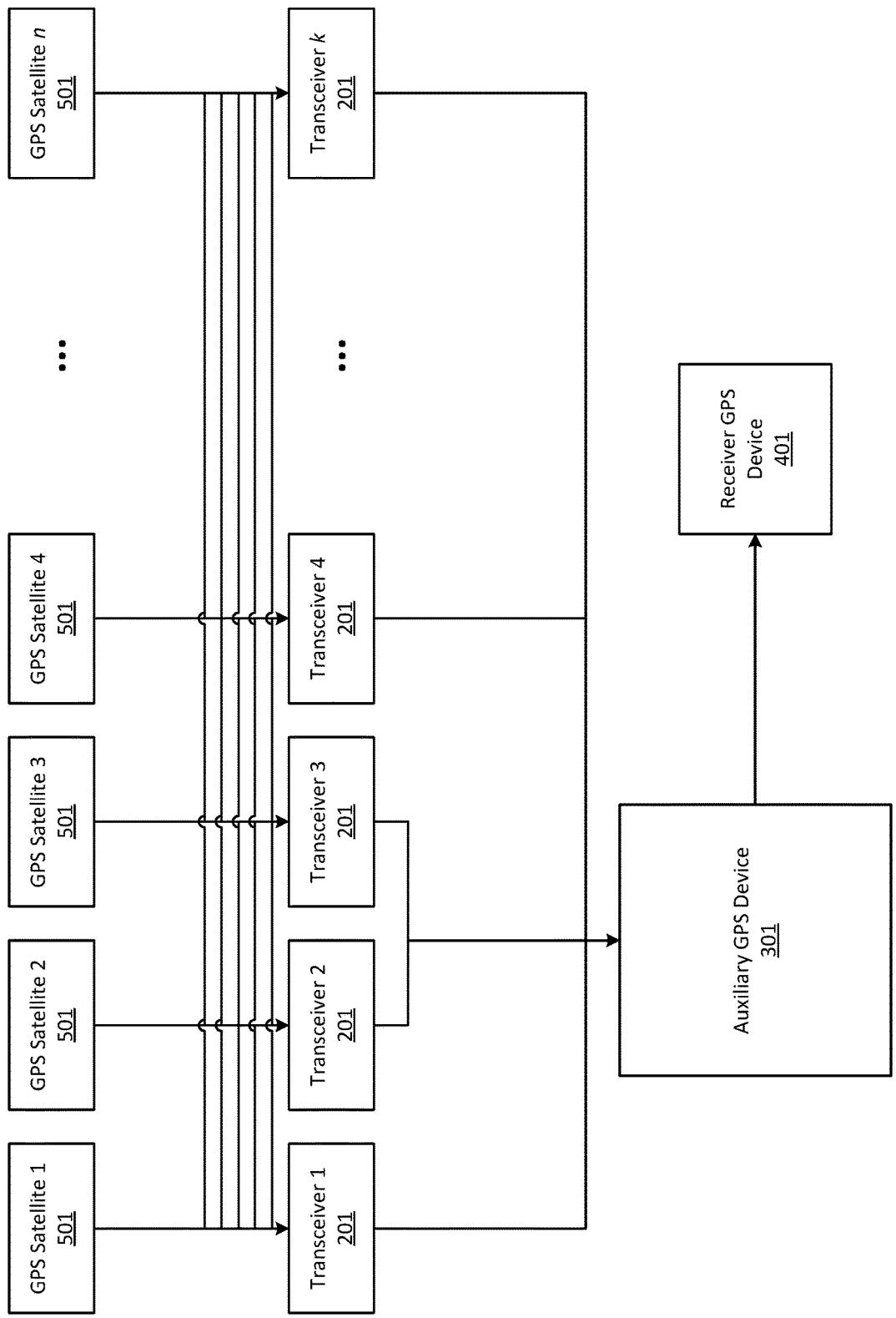
FIG. 2 is a block diagram of the components used to implement an embodiment of the invention.

This invention is practiced using two component groups: one or more transceivers 200 elevated above the ground and an auxiliary GPS device 301 on the ground, depicted in FIG. 1 and FIG. 2. A simple description of the invention can be that the transceivers 200 demodulate GPS data from four or more GPS satellites 500, then repackages and remodulates the GPS data onto a different frequency. The transceivers 200 then transmit these first GPS-like signals to an auxiliary GPS device 301. The auxiliary device 301 uses the signals from four or more transceivers 200 to determine the auxiliary device 301 position from the first GPS-like signals. Then, the auxiliary device 301 generates a simulated GPS signal that it feeds into the existing receiver GPS device 401. The existing receiver GPS device 401 receives and processes this signal as if it were a standard GPS signal, and uses it to compute the same position the auxiliary GPS device 301 computed based on data it received from the transceiver devices 200.

Figure 3:
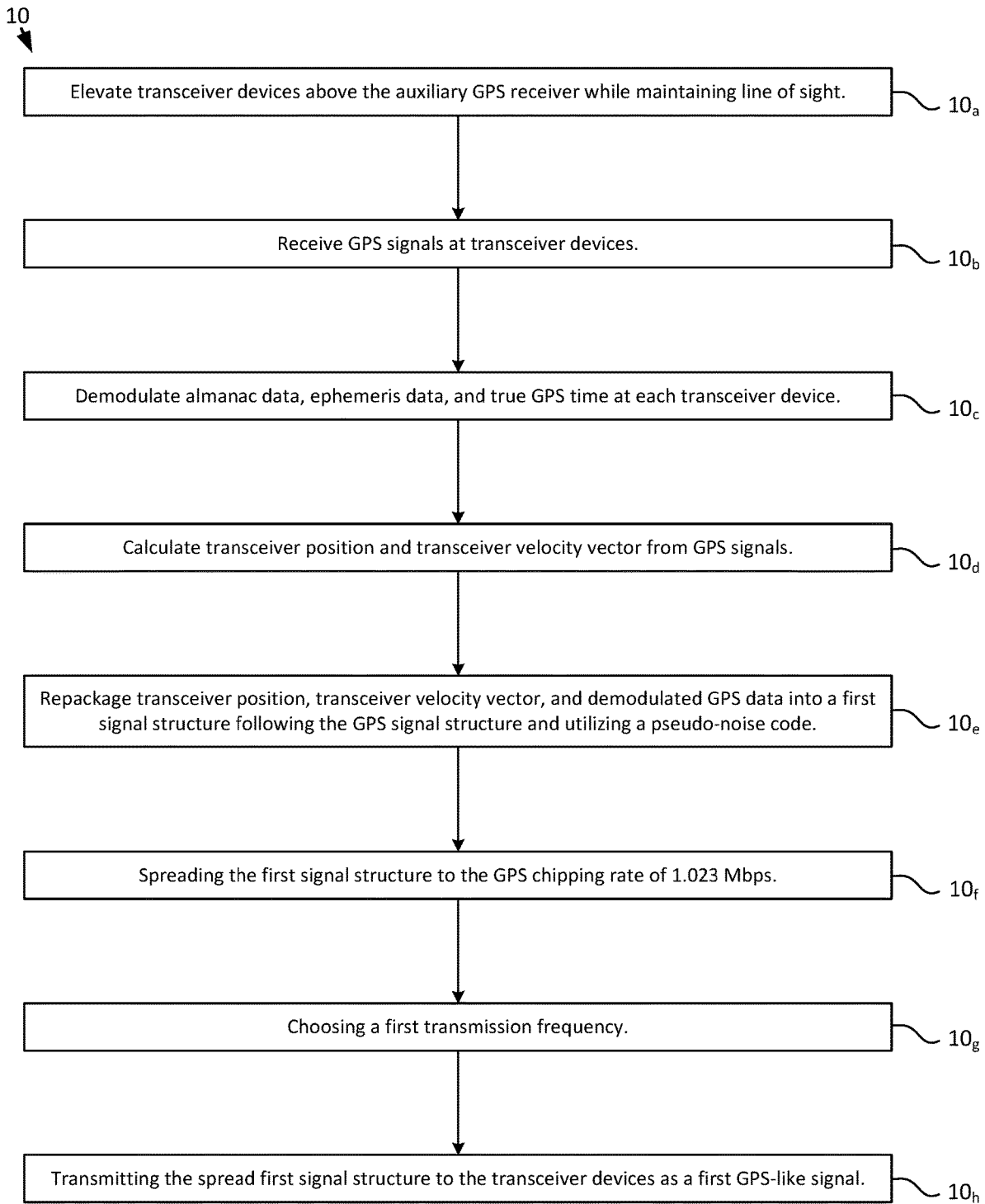
FIG. 3 is a flowchart showing the steps performed at or on the transceiver device in one embodiment of the invention.
Figure 5:
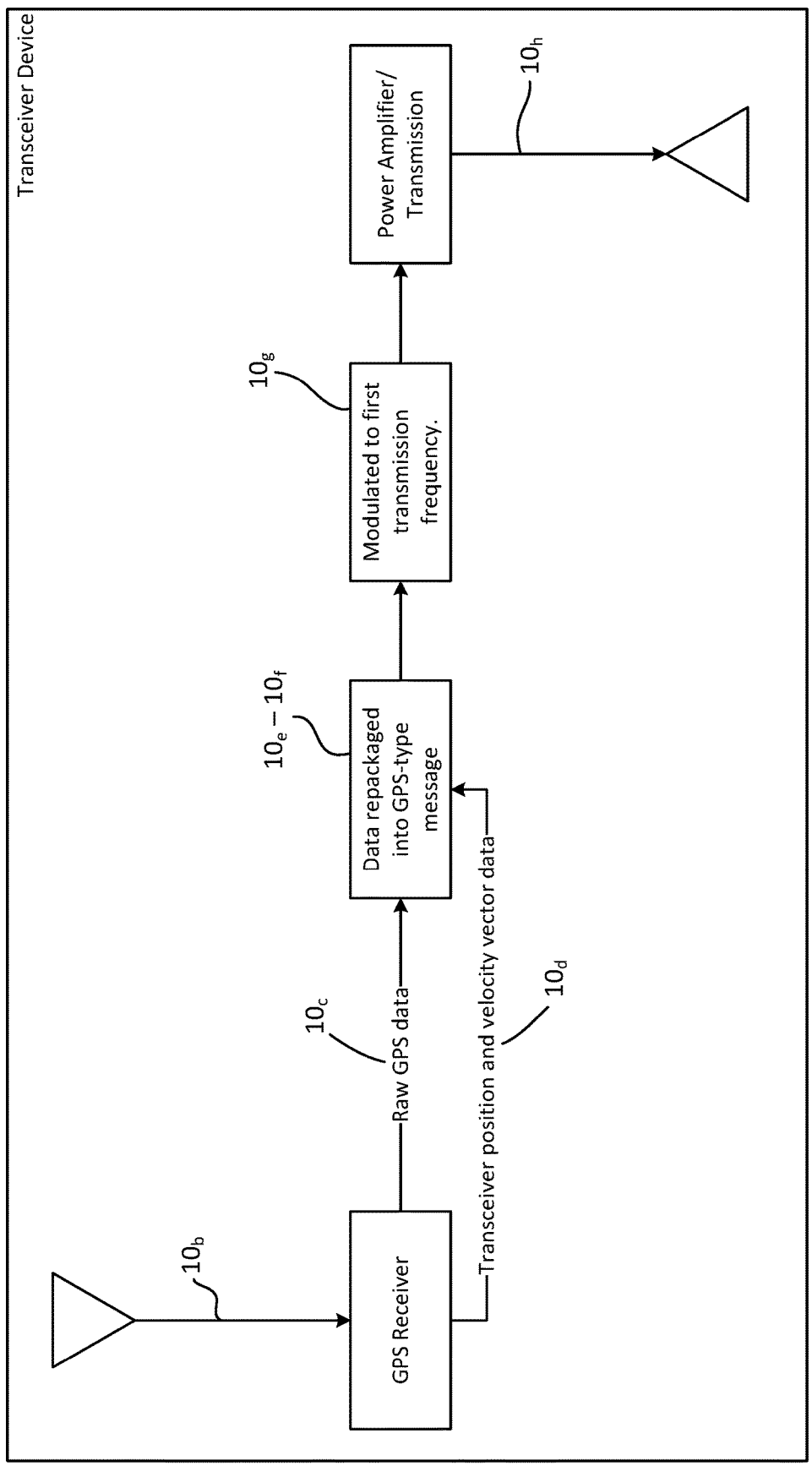
FIG. 5 is a flowchart showing the steps performed by the transceiver device in one embodiment of the invention.
Figure 6:
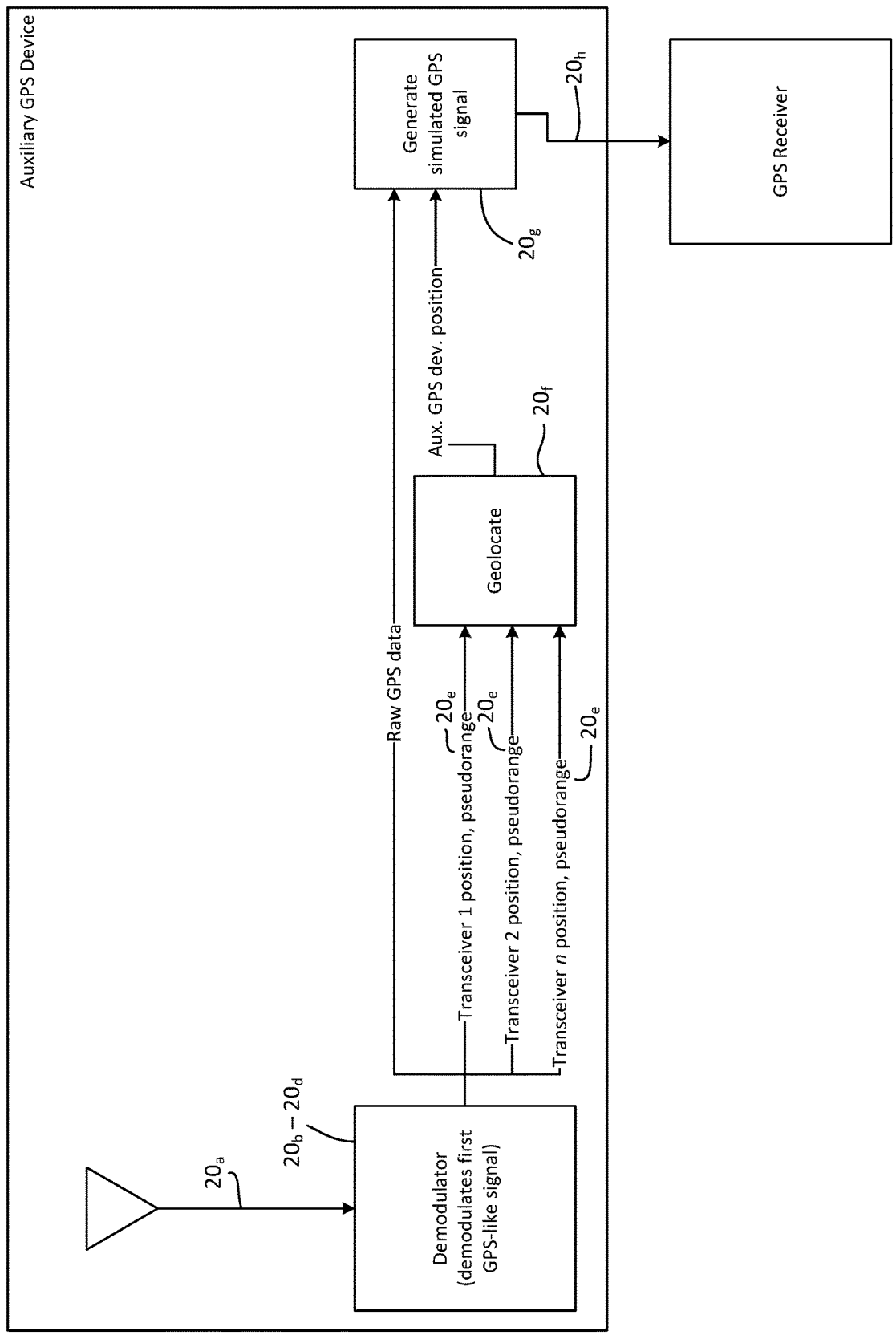
FIG. 6 is a flowchart showing the steps performed by the auxiliary GPS device in one embodiments of the invention.

Each transceiver device 201 comprises at least a traditional GPS receiver, a computing element (such as a microprocessor or field-programmable gate array), and a transmitter. FIG. 3 depicts the steps of the invention performed at or on the transceivers, method 10. The transceivers 200 must be first be elevated, step $10_a$, such that the auxiliary GPS device 301 on the ground has multiple transceivers 200 visible to it. Examples of where the transceivers 200 may be located include on high altitude dirigibles, attached to unmanned aerial vehicles, draped on top of jungle canopies, or placed at strategic terrestrial locations within a region. Next, the transceivers 200 receives the GPS signal from four or more GPS satellites 500 (also referred to as space vehicles [SVs]), step $10_b$. Four or more GPS satellites 500 are required to solve for the unknown position in three-dimensions as well as solve for the unknown clock error. The transceiver's 201 GPS device first demodulates the GPS data, including almanac and ephemeris information, step $10_c$. Using commercial off the shelf (COTS) hardware, the transceiver 201 then computes its own transceiver position and transceiver velocity vector from received GPS signal, step $10_d$. FIG. 5 depicts the method 10 as it takes place within the transceiver 201.

The transceivers 200 then take their own computed transceiver position and transceiver velocity vector from step $10_d$, as well as the demodulated almanac data, ephemeris data, and true GPS time from step $10_c$, (the demodulated GPS data), and repackages the data into a new signal structure, step $10_e$. The repackaged data in step $10_e$, can follow the GPS signal structure and use Gold codes for pseudo-random numbers (PRNs), and can even use Gold codes which are not currently in use (while the GPS constellation currently utilizes 32 Gold codes, many more exist and can be used). To convey the additional data of the transceiver location in step $10_e$, spare bits in the GPS message structure itself could be utilized (for example, pages 13 to 15 of subframe 4 of the GPS signal). Alternatively, a portion of the GPS message that is not currently useful (such as the almanac or ephemeris information of GPS satellites that are not currently visible) could be re-appropriated. The specific location of the transceiver location within the message structure must be pre-coordinated with the auxiliary GPS device 301. An advantage of utilizing the GPS signal and message structure is that the GPS signal has been widely studied and designs for GPS receivers 401 are abundant.

After step $10_e$, the transceiver 201 has generated a message in the GPS message structure which includes the parts of the original GPS signal required for calculating receiver position on the ground (e.g., GPS satellite almanac and ephemeris data) as well as the transceiver position and transceiver velocity vector. This message is then put into the GPS signal structure by spreading the message with the Gold code for the chosen PRN (which, again, can be one of the PRNs not currently used by the GPS), step $10_f$. Once this data has been spread by the Gold code to the GPS chipping rate of 1.023 MHz, the spread data is modulated to a new first transmission frequency. This first transmission frequency can be chosen in step $10_g$ for maximum penetration in foliage, or simply to avoid interference from jammers or spoofing devices. As long as the first transmission frequency is greater than half the spread bandwidth of approximately 2 MHz, the first GPS-like signal can theoretically be transmitted, step $10_h$.

Figure 4:
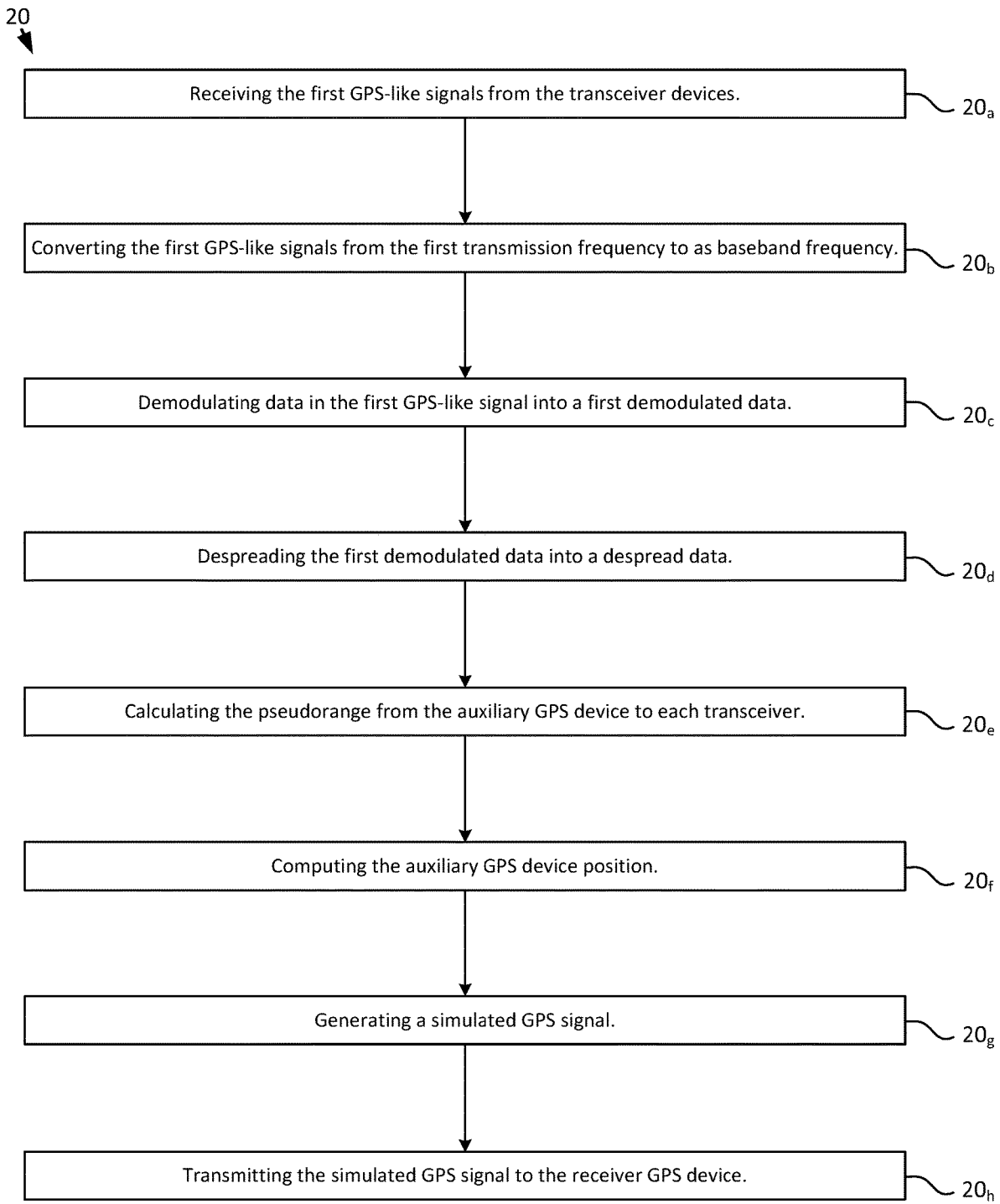
FIG. 4 is a flowchart showing the steps performed at or on the auxiliary GPS device in one embodiment of the invention.

The GPS-like signal, which contains all of the GPS data required to calculate the position of the GPS satellites 500 as well as the transceiver location and transceiver location vector, is transmitted over the first transmission frequency to an auxiliary GPS device 301 on the ground, step $10_h$. FIG. 4 depicts the steps of the invention performed at or on the auxiliary GPS device 301, method 20. FIG. 5 depicts the steps of method 20 as they are executed within the auxiliary GPS device 301. The auxiliary GPS device 301 is comprised of at least an antenna and front-end to receive the first GPS-like signals from the transceiver device 200, step $20_a$. The auxiliary GPS device 301 first down-converts the first GPS-like signals from the first transmission frequency to a baseband frequency, step $20_b$. Once down-converted from the first transmission frequency to the baseband frequency, the data in the first GPS-like signal is demodulated into a first demodulated data in the same manner as in a conventional GPS receiver, step $20_c$. The only differences are in the PRNs used to despread the data and in the extraction of the transceiver position and transceiver velocity vector from the spare bits (the reverse of the process described in step $10_e$).

The first demodulated data is then despread into a first despread data, step $20_d$. From this first despread data, a pseudorange is calculated from the auxiliary GPS device 301 to each transceiver 201, step $20_e$. Step $20_e$ is performed in the same manner as that for computing position based on GPS satellites 500 in a conventional GPS system. Instead of orbiting satellites however, the transceivers 200 are stationary or relatively slow moving. After the auxiliary GPS device 301 calculates pseudoranges between itself and each transceiver 201, step $20_e$, the auxiliary GPS device 301 can calculate its own position (as each transceiver position and transceiver velocity vector are also known), step $20_f$. For steps $20_e$ and $20_f$ the extensive work which has already been done in software and firmware for GPS receivers can be leveraged.

Now that the auxiliary GPS device 301 knows its own position, it can generate a simulated GPS signal, step $20_g$. The proliferation and ubiquity of GPS devices 401 in the last two decades has led to the deployment of a number of rigorously tested devices. Many of these devices are not simply standalone systems, but interact with other devices to provide timing or navigation. Instead of providing yet another device for users to interact with, the auxiliary GPS device 301 works in conjunction with and is backwards compatible with existing receiver GPS devices 401. This backward compatibility can be achieved by step $20_g$.

An embodiment of step $20_g$ is described in this paragraph. The auxiliary GPS device 301 knows its own position (the auxiliary GPS device position), the true GPS time, and the GPS almanac and ephemeris data. Calculating the locations of each of the GPS satellites 501 from the ephemeris and almanac data allows ranges from each GPS satellite 501 to the auxiliary GPS device 301 to be calculated. This determines the timing offset to simulate between the start of the GPS satellite 501 symbols. The Doppler frequency from each GPS satellite 501 (as would be seen by the receiver GPS device 40)1 can also be calculated. While the generation of the simulated GPS message is an involved problem, it is hardly intractable. GPS simulators are readily available where, if given the ephemeris data, can generate the GPS signal that would be seen by a receiver at any point on the Earth at a given time. This is, in effect, what the auxiliary GPS device 301 does in step $20_g$.

In this invention however, the simulated GPS signal is then transmitted in step $20_h$ from the auxiliary GPS device 301 into the antenna port of the receiver GPS device 401, which can be any GPS receiver. In one embodiment, the simulated GPS signal can be transmitted at the GPS L1 frequency (157.42 MHz), step $20_h$. Given the correct encryption keys, the P(Y) (or modernized M-code) could also be generated in step $20_g$. Since the simulated GPS signal of step $20_g$ is being generated synthetically, the auxiliary GPS device 301 can set the signal-to-noise-ratio (SNR) as high as practical.

Generating the simulated GPS signal in step $20_g$ can be thought of as solving the standard GPS problem in reverse. The standard GPS problem begins with receipt of the GPS signal, which is then demodulated for ephemeris and almanac data, from which the pseudoranges to the GPS satellites 501 can be estimated. The computation for the device position and time is iterated until the correct solution is found. In this invention, the device position is known by the auxiliary GPS device 301 and the ephemeris and almanac data is available from the GPS data passed through the transceivers 200. From this information, the auxiliary GPS device 301 creates the expected signal, which is transmitted into the antenna port of the receiver GPS device 401 in step $20_h$. Once the receiver GPS device 401 receives the simulated GPS signal, the receiver GPS device 401 processes the signal as if it were a true GPS signal coming from the actual GPS satellites 500. As far as the receiver GPS device 401 is concerned, the signal it receives via its antenna port is the true signal, and may be treated as such. The typical receiver GPS device 401 can demodulate the simulated GPS message, determine pseudoranges based on the PRN timing, and then iteratively find a solution to the geolocation problem. The typical receiver GPS device 401 can estimate the same position the auxiliary GPS device 301 calculated for itself and display it back to the user as if the receiver GPS device 401 received the GPS signal directly from the actual GPS satellites 500.

A significant advantage of this invention over previous methods is that it is backwards compatible with the myriad traditional receiver GPS devices 401 currently deployed in the field. These traditional receiver GPS devices 401 (along with their numerous certified interfaces) may still be used as before. This invention offers the advantage of providing a seamless experience for the end user.

A separate advantage of this invention is that the auxiliary GPS device 301 can receive the GPS signals at frequencies different from the standard GPS frequencies. This allows a frequency more conducive to penetrating foliage or buildings to be utilized. Furthermore, this ability of the transceivers 200 to transmit outside of the GPS band will mitigate GPS jamming and spoofing threats. Additionally, authentication can be added to the GPS-like signal transmitted by the transceiver 201 in step $10_h$. The auxiliary GPS device 301 can verify the authenticity of the data using this code. This authentication code may also be transmitted in spare bits of the GPS message structure itself.

While this invention may seem at first blush to contain an unnecessary set of steps given that the auxiliary GPS device 301 has already calculated its position in step $20_f$, the additional steps taken in generating a simulated GPS signal in step $20_g$ allows existing and already certified GPS receivers to be used in a degraded environment. That is, instead of designing and certifying new GPS receivers and accessory devices, existing receivers, hardware, and accessories can be used with the auxiliary GPS device 301, allowing improved GPS performance in a degraded environment for existing GPS systems. As this method uses the existing GPS antenna port of receiver GPS devices 401, no new connections or interfaces are required, and no existing connections are broken.

Another advantage is that the transceivers 200 can output more power than they receive to further enhance the signal strength seen at the auxiliary GPS device 301. Because the signals will not be in the GPS band on the RF spectrum, these signals will not run the risk of interfering with other GPS users.

This method also does not require any calibration prior to use, as required by INUs or other alternative methods. This invention is self-calibrating upon receipt of signals from the transceivers 200.

The transceivers 200 can use traditional GPS, star trackers, or any other means to establish accurate transceiver position, transceiver velocity, and accurate timing data. If traditional GPS signals are not used, the transceiver 201 or auxiliary GPS device 301 would have to generate synthesized ephemeris and almanac data.

The RF band to transmit the first GPS-like signal in step $10_h$ can also be optimized for any given target environment. For example, a first transmission frequency can be chosen in step $10_g$ to avoid heavy RF congestion within certain frequency bands. The transceivers 200 may also employ a software defined radio to allow them to change transmit frequencies on command or on a schedule (in this embodiment, the auxiliary GPS device 301 would have to coordinate the frequency switching schedule with the transceivers 200). This synchronization data could be relayed as additional data embedded in the GPS navigation message at the current frequency. In one embodiment, the transceiver 201 can inform the auxiliary GPS device 301 that a frequency change is imminent. The auxiliary GPS device could the update its receive frequency. The RF may also be set prior to a mission, and then fixed or change during the mission.

The signals from the transceivers 200 may adhere to the standard GPS signal structure, or they may transmit the first GPS-like signal data according to an alternative signal structure. The advantage of choosing an alternative signal structure is that a frequency of lower than 5 MHz could be used. The data rate of the true GPS signal is only 50 bps, but the direct sequence spreading increases the bandwidth to approximately 2 MHz. If only the data bits are transmitted, it is possible to use frequencies in the tens of kHz, which would allow even greater penetration of the first GPS-like signal through jungle canopies and other adverse environments.

The auxiliary GPS device 301 could receive power from the traditional receiver GPS device 401, or it may have its own battery or be connected to an external power source.

The transceivers 200 may be pseudolite-like unmanned aerial vehicles or dirigibles, or they could be nanosatellites placed in low-Earth orbit. Alternatively, the transceivers could be stationary devices placed onto the jungle canopy or strategically around a conflict area.

The auxiliary GPS device 301 can have a receiver or receivers for simultaneously receiving the modulated data frequency from the transceivers 200 and from traditional GPS signals (if any are visible). The auxiliary GPS device 301 can then integrate the information from both sources and output them to the receiver GPS device 401 through the generated simulated GPS signal.

The transceivers 200 can also receive and demodulate the civilian C/A signal, the encrypted military P(Y) signal, or any of the modernized GPS signals (such as L1C or M-code). Similarly, the auxiliary GPS device 301 can also generate simulated C/A signals, encrypted P(Y) signals, or any of the modernized GPS signals (where the appropriate encryption keys are provided).

The transceiver 201 GPS reception antenna may be highly directional or active null-steering antennas to mitigate the effects of jamming sources. A highly accurate clock may also be included in the transceiver 201, obviating the need for four or more GPS satellites 500, as clock error would not need to be resolved.

From the above description of the present invention, it is manifest that various techniques may be used for implementing its concepts without departing from the scope of the claims. The described embodiments are to be considered in all respects as illustrative and not restrictive. The method disclosed herein may be practiced in the absence of any element that is not specifically claimed and/or disclosed herein. It should also be understood that the present invention is not limited to the particular embodiments described herein, but is capable of being practiced in many embodiments without departure from the scope of the claims.

We claim:

1. A method of providing position, navigation, and timing information comprising:
   providing at least four transceiver devices;
   providing an auxiliary GPS device;
   providing a receiver GPS device;
   receiving at each transceiver device a plurality of GPS signals from a plurality of GPS satellites;
   calculating at each transceiver a transceiver position and a transceiver velocity vector;
   repackaging at each transceiver the transceiver position, transceiver velocity vector, and a demodulated GPS data into a spread first signal structure;
   transmitting from each transceiver the spread first signal structure as a first GPS-like signal;
   receiving at the auxiliary GPS device the first GPS-like signal;
   generating at the auxiliary GPS device a simulated GPS signal;
   transmitting the simulated GPS signal at the signal device as a transmitted simulated GPS signal;
   receiving at the receiver GPS device the transmitted simulated GPS signal.

2. The method of claim 1, further comprising the step of elevating the transceiver devices above the auxiliary GPS receiver such that the auxiliary GPS receiver maintains line of sight with each of the transceiver devices.

3. The method of claim 1, wherein the demodulated GPS data comprises transceiver almanac data, ephemeris data, and a true GPS time from each GPS signal.

4. The method of claim 3, wherein the repackaging step further comprises the substep of repackaging the transceiver position, transceiver velocity vector, and demodulated GPS data into a first signal structure, wherein the first signal structure follows a GPS signal structure and utilizes a pseudo-noise code.

5. The method of claim 3, wherein the repackaging step further comprises the substep of spreading the first signal structure to the GPS chipping rate, generating a first signal structure.

6. The method of claim 3, wherein the repackaging step further comprises the substep of choosing a first transmission frequency for the spread first signal structure.

7. The method of claim 1, further comprising the step of converting at the auxiliary GPS device the first GPS-like signal from a first transmission frequency to a baseband frequency.

8. The method of claim 1, further comprising the step of demodulating the first GPS-like signal at the auxiliary GPS device into a first demodulated data.

9. The method of claim 1, further comprising the step of despreading at the auxiliary GPS device the first demodulated data into a first despread data.

10. The method of claim 1, further comprising the step of calculating at the auxiliary GPS device a pseudorange for each transceiver.

11. The method of claim 1, further comprising the step of computing at the auxiliary GPS device an auxiliary GPS device position.

12. A method of providing position, navigation, and timing information comprising:
    providing at least four transceiver devices;
    providing an auxiliary GPS device;
    providing a receiver GPS device;
    elevating the transceiver devices above the auxiliary GPS receiver such that the auxiliary GPS receiver maintains line of sight with each of the transceiver devices;
    receiving at each transceiver device a plurality of GPS signals from a plurality of GPS satellite;
    demodulating at each transceiver almanac data, ephemeris data, and a true GPS time from each GPS signal into a demodulated GPS data;
    calculating at each transceiver a transceiver position and a transceiver velocity vector from the plurality of GPS signals;
    repackaging at each transceiver the transceiver position, transceiver velocity vector, and demodulated GPS data into a first signal structure, wherein the first signal structure follows a GPS signal structure and utilizes a pseudo-noise code;
    spreading the first signal structure to the GPS chipping rate, generating a spread first signal structure;
    choosing a first transmission frequency for the spread first signal structure;
    transmitting the spread first signal structure from the transceiver devices as a first GPS-like signal;
    receiving at the auxiliary GPS device the first GPS-like signal;

converting at the auxiliary GPD device the first GPS-like signal from the first transmission frequency to a baseband frequency;

demodulating the first GPS-like signal at the auxiliary GPS device into a first demodulated data;

despreading at the auxiliary GPS device the first demodulated data into a first despread data;

calculating at the auxiliary GPS device a pseudorange for each transceiver;

computing at the auxiliary GPS device an auxiliary GPS device position;

generating a simulated GPS signal at the auxiliary device;

transmitting the simulated GPS signal at the auxiliary device as a transmitted simulated GPS signal;

receiving at the receiver GPS device the simulated GPS signal;

wherein the first transmission frequency is greater than 2 MHz; and wherein the pseudo-noise code is used to despread the first demodulated data into the first despread data at the auxiliary GPS device and extract the transceiver position and transceiver velocity data into the first demodulated data.

13. The method of claim 12, wherein the first signal structure utilizes a Gold pseudo-noise code.

14. The method of claim 12, wherein the first signal structure utilizes spare bits in a GPS signal structure to transmit the transceiver position data.

15. The method of claim 12, wherein the first signal structure is spread to the GPS chipping rate by utilizing a Gold pseudo-noise code.

16. The method of claim 12, wherein the first transmission frequency is selected for maximum foliage penetration.

17. The method of claim 12, wherein the first transmission frequency is selected to avoid radio frequency interference.

18. The method of claim 12, wherein the simulated GPS signal is generated from the auxiliary device position, the true GPS time, and the ephemeris data.

19. The method of claim 12, wherein the simulated GPS signal includes a calculated Doppler frequency from each GPS satellite to the auxiliary GPS device.

20. A method of providing position, navigation, and timing information comprising:

providing at least four transceiver devices;

providing an auxiliary GPS device;

providing a receiver GPS device;

elevating the transceiver devices above the auxiliary GPS receiver such that the auxiliary GPS receiver maintains line of sight with each of the transceiver devices;

receiving at each transceiver device a plurality of GPS signals from a plurality of GPS satellites;

demodulating at each transceiver almanac data, ephemeris data, and a true GPS time from each GPS signal into a demodulated GPS data;

calculating at each transceiver a transceiver position and a transceiver velocity vector from the plurality of GPS signals;

repackaging at each transceiver the transceiver position, transceiver velocity vector, and demodulated GPS data into a first signal structure, wherein the first signal structure follows a GPS signal structure and utilizes a pseudo-noise code;

spreading the first signal structure to the GPS chipping rate, generating a spread first signal structure;

choosing a first transmission frequency for the spread first signal structure;

transmitting the spread first signal structure from the transceiver devices as a first GPS-like signal;

receiving at the auxiliary GPS device the first GPS-like signal;

converting at the auxiliary GPD device the first GPS-like signal from the first transmission frequency to a baseband frequency;

demodulating the first GPS-like signal at the auxiliary GPS device into a first demodulated data;

despreading at the auxiliary GPS device the first demodulated data into a first despread data;

calculating at the auxiliary GPS device a pseudorange for each transceiver;

computing at the auxiliary GPS device an auxiliary GPS device position;

generating a simulated GPS signal at the auxiliary device;

transmitting the simulated GPS signal at the auxiliary device as a transmitted simulated GPS signal;

receiving at the receiver GPS device the simulated GPS signal;

wherein the first transmission frequency is greater than 2 MHz; wherein the pseudo-noise code is used to despread the first demodulated data into the first despread data at the auxiliary GPS device and extract the transceiver position and transceiver velocity data into the first demodulated data; wherein the first signal structure stylizes spare bits in a GPS signal structure to transmit the transceiver position data; wherein the pseudo-noise code is a Gold pseudo-noise code; wherein the simulated GPS signal is generated from the auxiliary device position, the true GPS time, and the ephemeris data; and wherein the simulated GPS signal includes a calculated Doppler frequency from each GPS satellite to the auxiliary GPS device.

* * * * *